(12) United States Patent
Vyroubal (10) Patent No.: US 9,892,860 B2
(45) Date of Patent: Feb. 13, 2018

(54) CAPACITOR WITH COINED LEAD FRAME

(71) Applicant: AVX Corporation, Fountain Inn, SC (US)

(72) Inventor: Ales Vyroubal, Bludov (CZ)

(73) Assignee: AVX Corporation, Fountain Inn, SC (US)

( * ) Notice: Subject to any disclaimer, the term of this patent is extended or adjusted under 35 U.S.C. 154(b) by 211 days.

(21) Appl. No.: 14/551,251

(22) Filed: Nov. 24, 2014

(65) Prior Publication Data

US 2016/0148755 A1    May 26, 2016

(51) Int. Cl.
| | |
|---|---|
| *H01G 9/012* | (2006.01) |
| *H01G 9/15* | (2006.01) |
| *H01G 2/06* | (2006.01) |
| *H01G 9/028* | (2006.01) |
| *H01G 9/048* | (2006.01) |

(52) U.S. Cl.
CPC ............. *H01G 9/012* (2013.01); *H01G 2/065* (2013.01); *H01G 9/028* (2013.01); *H01G 9/15* (2013.01); *H01G 9/048* (2013.01)

(58) Field of Classification Search
CPC .. H01G 9/04; H01G 9/012; H01G 9/15; H01G 9/145; H01G 9/28
See application file for complete search history.

(56) References Cited

U.S. PATENT DOCUMENTS

| | | | |
|---|---|---|---|
| 5,457,862 A | 10/1995 | Sakata et al. | |
| 5,473,503 A | 12/1995 | Sakata et al. | |
| 5,545,921 A | 8/1996 | Conru et al. | |
| 5,576,246 A | 11/1996 | Conru et al. | |
| 5,729,428 A | 3/1998 | Sakata et al. | |
| 5,812,367 A | 9/1998 | Kudoh et al. | |
| 6,197,252 B1 | 3/2001 | Bishop et al. | |
| 6,322,912 B1 | 11/2001 | Fife | |
| 6,391,275 B1 | 5/2002 | Fife | |
| 6,416,730 B1 | 7/2002 | Fife | |
| 6,527,937 B2 | 3/2003 | Fife | |
| 6,555,899 B1 | 4/2003 | Chung et al. | |
| 6,576,099 B2 | 6/2003 | Kimmel et al. | |
| 6,592,740 B2 | 7/2003 | Fife | |

(Continued)

FOREIGN PATENT DOCUMENTS

JP         02007096021 A  *  4/2007

*Primary Examiner* — Nguyen Ha
(74) *Attorney, Agent, or Firm* — Dority & Manning, P.A.

(57) ABSTRACT

A solid electrolytic capacitor including a capacitor element having a front surface, a rear surface, an upper surface, a lower surface, a sintered anode body; an anode lead; an anode termination; and a cathode termination is described. The anode termination has a planar portion and an upstanding portion, where the planar portion of the anode termination has a first section and a second section, where the first section has a first thickness and the second section has a second thickness. Further, the second thickness is less than the first thickness, and the first section is disposed between the upstanding portion and the second section. In addition, the second section is disposed beneath the lower surface of the capacitor element. Moreover, the anode lead and capacitor element are generally parallel with the planar portion. Such an arrangement can result in a capacitor exhibiting improved mechanical and electrical stability.

20 Claims, 5 Drawing Sheets

(56) References Cited

U.S. PATENT DOCUMENTS

| | | |
|---|---|---|
| 6,639,787 B2 | 10/2003 | Kimmel et al. |
| 6,674,635 B1 | 1/2004 | Fife et al. |
| 6,847,103 B1 | 1/2005 | Perez et al. |
| 6,965,157 B1 | 11/2005 | Perez et al. |
| 6,987,663 B2* | 1/2006 | Merker .................... H01G 9/10 252/500 |
| 7,220,397 B2 | 5/2007 | Kimmel et al. |
| 7,262,511 B2 | 8/2007 | Osako et al. |
| 7,271,995 B2* | 9/2007 | Edson .................... H01G 2/065 361/529 |
| 7,341,705 B2 | 3/2008 | Schnitter |
| 7,381,396 B2 | 6/2008 | Thomas et al. |
| 7,419,926 B2 | 9/2008 | Schnitter et al. |
| 7,515,396 B2 | 4/2009 | Biler |
| 7,542,267 B2 | 6/2009 | Ishijima |
| 7,656,647 B2 | 2/2010 | Edson et al. |
| 8,125,769 B2 | 2/2012 | Djebara |
| 8,139,344 B2 | 3/2012 | Navratil et al. |
| 8,199,460 B2 | 6/2012 | Vyroubal |
| 8,514,550 B2 | 8/2013 | Vyroubal |
| 8,582,278 B2* | 11/2013 | Zednicek ............... H01G 9/012 361/523 |
| 2004/0145065 A1* | 7/2004 | Sano ..................... H01G 9/012 257/787 |
| 2006/0197199 A1 | 9/2006 | Lange |

\* cited by examiner

CAPACITOR WITH COINED LEAD FRAME

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors are often formed by pressing a metal powder (e.g., tantalum) around an anode lead, sintering the pressed part, anodizing the sintered anode, and thereafter applying a solid electrolyte, after which the resulting capacitor element is electrically connected to a lead frame at an anode termination and a cathode termination. In some embodiments, the anode termination contains a planar portion and an upstanding portion that is bent upwardly toward the capacitor element and welded to the anode lead extending from the anode. Meanwhile, the cathode termination may contain a planar portion and an upstanding portion, where the planar portion is connected to the capacitor element via a conductive adhesive or by welding. In any event, because the electrical connection at the anode termination is formed between the anode lead and the upstanding portion of the anode termination, the planar portion of the anode termination must generally be isolated from the capacitor element, such as via an encapsulating material, to prevent a short circuit, as discussed in more detail below. Such a capacitor can include a capacitor element having a lower surface, an upper surface, a front surface, a rear surface, and opposing side surfaces. An anode lead typically extends from the front surface of the capacitor element in a longitudinal direction. The capacitor also includes an anode termination, which can have a planar portion and an upstanding portion, as well as a cathode termination, which can have a planar portion and an upstanding portion. With such a capacitor, the capacitor element is typically electrically connected to the planar portion of the cathode termination via a conductive adhesive. Meanwhile, the anode lead is welded to the upstanding portion of the anode termination at anode lead slot to electrically connect the capacitor element to the anode termination.

Because the capacitor element is electrically connected to the anode termination via the weld or other suitable connection between the anode lead and the upstanding portion of the anode termination at anode lead slot, and because the planar portion of the anode termination and the planar portion of the cathode termination are typically formed in the same plane and have the same thickness, the capacitor element must generally be situated in an inclined position in order to ensure that the capacitor element can be sufficiently electrically isolated from the planar portion of the anode termination via encapsulating material, for example. The inclined position is maintained by forming the anode lead slot at a high enough location along the upstanding portion of the anode termination to raise the front surface of the capacitor element sufficiently above the planar portion of the anode termination. In this manner, the encapsulating material can fill the gap between the capacitor element and the planar portion of the anode termination to electrically isolate the capacitor element. Unfortunately, this technique is problematic in that it places a significant amount of stress on the anode lead weld or other suitable connection, as the single weld is essentially holding the entire capacitor element in an inclined position to create sufficient isolation between the capacitor element and the planar portion of the anode termination. Such an arrangement can weaken the connection between the anode lead and the upstanding portion of the anode termination and can place significant force on the anode lead, which, in turn, result s in an increase in the electrical series resistance (ESR) and leakage current (DCL) of the capacitor, which detrimentally affects the electrical performance of the capacitor.

As such, a need remains for a mechanically and electrically stable solid electrolytic capacitor where the forces placed on the anode lead and weld are minimized.

SUMMARY OF THE INVENTION

In accordance with one embodiment of the present invention, a solid electrolytic capacitor is disclosed that includes a capacitor element, an anode termination having a planar portion and an upstanding portion, and a cathode termination having a planar portion and an upstanding portion. The capacitor element has a front surface, a rear surface, an upper surface, and a lower surface and includes a sintered, porous anode body; a dielectric overlying the anode body; and a solid electrolyte cathode overlying the dielectric; wherein an anode lead extends from the front surface of capacitor element in a longitudinal direction. Meanwhile, the anode termination has a planar portion and an upstanding portion, where the planar portion of the anode termination has a first section and a second section, wherein the first section has a first thickness and the second section has a second thickness. Further, the second thickness is less than the first thickness, the first section is disposed between the upstanding portion and the second section, and the second section is disposed beneath the lower surface of the capacitor element. In addition, the anode lead and the capacitor element are generally parallel with the planar portion of the anode termination.

In another embodiment, a method for forming a capacitor from a capacitor element and a lead frame is disclosed. The lead frame includes an anode termination and a cathode termination. The anode termination has a planar portion and an upstanding portion, and the cathode termination also has a planar portion and an upstanding portion. Further, the capacitor element includes an anode, a dielectric layer overlying the anode, and a solid electrolyte cathode overlying the dielectric layer, wherein an anode lead extends from a surface of the capacitor element. The method includes coining a part of the planar portion of the anode termination to form a planar portion having a first section with a first thickness and a second section with a second thickness, wherein the second thickness is less than the first thickness; disposing a conductive adhesive on the planar portion of the cathode termination; positioning the capacitor element above the second section of the planar portion of the anode termination and the planar portion of the cathode termination of the lead frame so that a lower surface capacitor element contacts the conductive adhesive, where the capacitor element is generally parallel with the planar portion of the anode termination and the planar portion of the cathode termination; and electrically connecting the anode lead to the upstanding portion of the anode termination, where the anode lead is generally parallel with the planar portion of the anode termination.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawing is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor that includes a capacitor element having a lower surface, an upper surface, a front surface, a rear surface, and opposing side surfaces, where the capacitor element includes an anode body, a dielectric overlying the anode body, a solid electrolyte that overlies the dielectric, an anode lead extending from the front surface of the anode body in the x-direction, and a lead frame that includes an anode termination having a planar portion and an upstanding portion, as well as a cathode termination having a planar portion and an upstanding portion. The upstanding portion of the anode termination can have a slot in which the anode lead can be positioned and then welded or otherwise connected. Further, the planar portion of the anode termination has a coined section, and the planar portion of the cathode termination can also have a coined section. In other words, the planar portions of both terminations can be stamped, pressed, or otherwise modified to create a thickness gradient along the planar portions of each of the terminations such that the coined sections have a smaller thickness than the uncoined sections.

In particular, the thickness gradient along the planar portion of the anode termination, where the section of the planar portion of the anode termination located beneath or below the lower surface of the capacitor element has a smaller thickness compared to the thickness of the planar portion of the anode termination located between the upstanding portion of the anode termination and the front surface of the capacitor element, allows for the capacitor element to be situated generally parallel to the planar portion of the anode and cathode terminations while still maintaining sufficient isolation between the planar portion of the anode termination and the lower surface of the capacitor element. Further, the thickness gradient also allows for the anode lead slot in the upstanding termination to be located at a height closer to the lower surface of the capacitor element than if no thickness gradient was present because, due to the thickness gradient along the planar portion of the anode termination, it is not necessary to incline the capacitor element to create sufficient isolation between the lower surface of the capacitor element and the planar portion of the anode termination. As such, the anode lead can be positioned generally parallel to the planar portion of the anode termination rather than at an incline, which reduces the stress placed on the weld between the anode lead and the upstanding portion of the anode lead at the anode lead slot. In this manner, the mechanical and electrical stability of the resulting solid electrolytic capacitor is improved.

Meanwhile, the planar portion of the cathode termination can also be coined, pressed, stamped, or otherwise modified such that it also has a thickness gradient, where the sections of the planar portion of the resulting cathode termination located beneath the edges of the rear surface of the capacitor element and facing the anode termination (i.e., the peripheral edges of the planar portion of the cathode termination excluding the edge where the upstanding portion of the cathode termination begins) have a smaller thickness than the remainder of the planar portion of the cathode termination. Such a configuration results in a planar portion of the cathode termination that can have an increased contact area with the capacitor element, which can improve the electrical stability of the resulting solid electrolytic capacitor.

Further, the upstanding portion of the cathode termination can, in some embodiments, have a first upstanding section and a second upstanding section, where the sections are located on opposite edges of the rear surface of the capacitor element. Each section can have a vertical portion and a paddle portion. The shape and location of the first and second upstanding sections helps to look the capacitor element in place and prevent movement at the cathode end, which can contribute to the improvement in the mechanical and electrical stability of the solid electrolytic capacitor.

Various embodiments of the present invention will now be described in more detail.

I. Lead Frame Anode and Cathode Terminations

As mentioned above, the solid electrolytic capacitor includes a capacitor element that is connected to a lead frame having an anode termination and a cathode termination. Any conductive material can be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the overall thickness of the anode and cathode terminations may range from about 0.05 to about 1 millimeter, in some embodiments from about 0.05 to about 0.5 millimeters, and from about 0.1 to about 0.25 millimeters. Meanwhile, at the coined sections of the planar portions of the anode and cathode terminations, the thickness can be from about 10% to about 90%, such as from about 20% to about 80%, such as from about 30% to about 70% of the overall thickness of the anode and cathode terminations. As such, the thickness of the coined sections of the terminations can range from about 0.05 millimeters to about 0.9 millimeters, such as from about 0.01 millimeters to about 0.4 millimeters, such as from about 0.03 millimeters to about 0.175 millimeters. Further, the coined anode and cathode terminations can be formed by pressing each termination in a mold with a hydraulic press or other suitable press to subject the surface of the termination to high stress, which induces plastic flow of the material. Such softening of the surface layer being pressed allows the material to take the shape of the mold to create a coined termination having a thickness gradient.

After being formed into their desired shapes, the anode and cathode terminations may be connected to the capacitor element using any technique known in the art, such as resistance welding, laser welding, adhesive bonding, etc. For instance, the anode termination can be electrically connected to the capacitor element by resistance welding or laser welding the anode lead to the upstanding portion of the anode termination at an anode lead slot. Meanwhile, the planar portion of the cathode termination can be electrically connected to the capacitor element using a conductive adhesive. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes. Regardless of the manner in which the capacitor element is electrically connected to the anode termination and cathode terminations, various features of the anode termination and the cathode termination contribute to the improved properties of the resulting solid electrolytic capacitor. The particular features of the anode termination and cathode termination in relation to the capacitor element are discussed in more detail below in reference to FIGS. 1-6.

As an initial matter, as shown in FIGS. 1-6, the solid electrolytic capacitor 100 includes a capacitor element 126 having a lower surface 121, an upper surface 122, a front surface 123, a rear surface 124, and a side surface 125, where the capacitor element 126 includes an anode body 111, a dielectric overlying the anode body (not shown), a solid electrolyte that overlies the dielectric (not shown), an anode lead 113 extending from the front surface 123 of the anode body 111 in the x-direction, and a lead frame 200 that includes an anode termination 114 having a planar portion 115 and an upstanding portion 116, as well as a cathode termination 117 having a planar portion 118 and an upstanding portion 119.

Turning first to the anode termination 114, particular reference can be made to FIGS. 1-4. As shown, the anode termination 114 has a planar portion 115 extending in the x-direction and an upstanding portion 116 extending in the y-direction. The planar portion 115 of the anode termination 114 includes a coined section 128 that, due to a thickness gradient created by coining of the anode termination 114, has a thickness that is less than the thickness of the uncoined section 130. The uncoined section 130 is disposed between the upstanding portion 116 of the anode termination 114 and the uncoined section 128, which has an edge 138 that can face and is closest to the cathode termination 117 in the x-direction. As mentioned above, the presence of the thickness gradient due to the coined section 128 allows for the capacitor element 126 to be positioned generally parallel to the planar portion 115 of the anode termination 114 while still maintaining sufficient isolation between the lower surface 121 of the capacitor element and the planar portion 115 of the anode termination 114, which can be created by encapsulating material 112.

Figure 1:
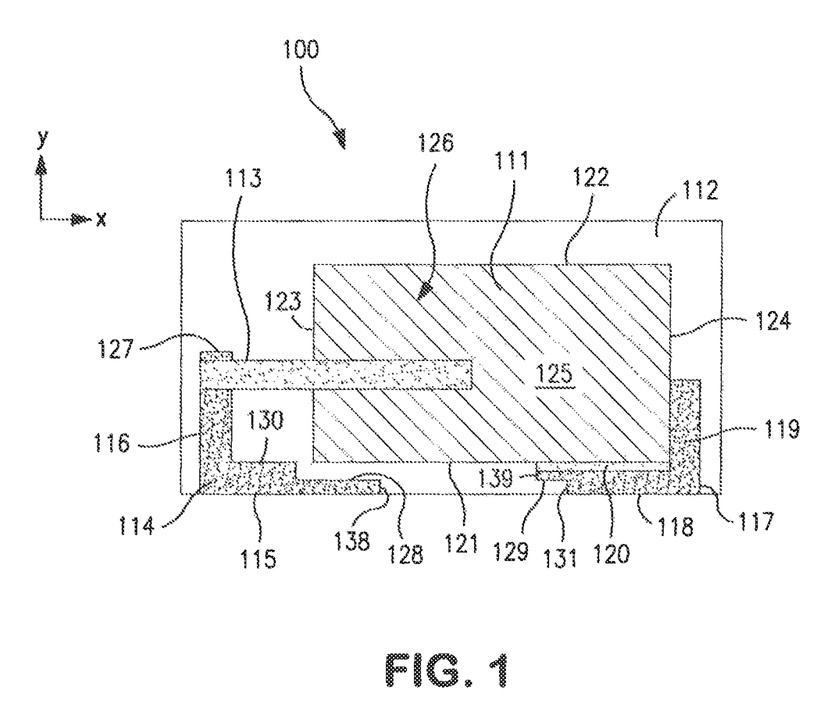
FIG. 1 is a cross-sectional view of a side surface of a solid electrolytic capacitor according to one embodiment of the present invention.

Meanwhile, as shown in FIG. 1, the upstanding portion 116 of the anode termination 114 extends in the y-direction and includes a slot 127 for receiving an anode lead 113. The anode lead 113 can be connected to the upstanding portion 116 at the slot 127 by resistance welding, laser welding, or any other suitable method. Further, the anode lead 113 can be positioned in the slot 127 such that the anode lead 113 is generally parallel with the planar portion 115 of the anode termination 114 in the x-direction. In other words, the anode lead 113 is not inclined relative to the planar portion 115 of the anode termination 114. As a result, the slot 127 can be located along the upstanding portion 116 at a height in the y-direction that is lower than the height of the slot in a conventional capacitor, where the capacitor element 26 must be inclined to create sufficient isolation between the capacitor element 26 and the planar portion 15 of the anode termination. Generally, the slot 127 of the upstanding portion 116 of the anode termination 114 can be positioned at height that is about 0.01 millimeters to about 2.5 millimeters, such as from about 0.1 millimeters to about 1.0 millimeters, such as from about 0.3 millimeters to about 0.9 millimeters, lower than the anode lead slot of conventional capacitors in the y-direction. The location of the slot 127 in FIG. 1 can be lowered compared to the slot in a conventional capacitor because the capacitor element 126 and the anode lead 113 can be generally parallel with the planar portion 115 of the anode termination 114 in the x-direction due to the decreased thickness of the planar portion 115 of the anode termination 114 at coined section 128 compared to uncoined section 130, thus creating sufficient isolation between the lower surface 121 of the capacitor element 126 and the planar portion 115 of the anode termination 114.

Figure 2:
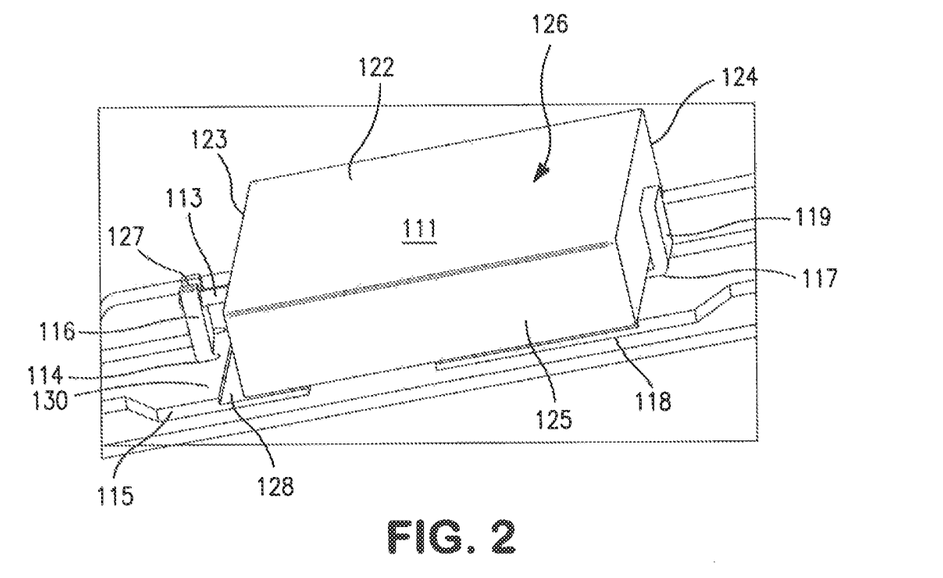
FIG. 2 is a perspective view of the solid electrolytic capacitor of FIG. 1.
Figure 3:
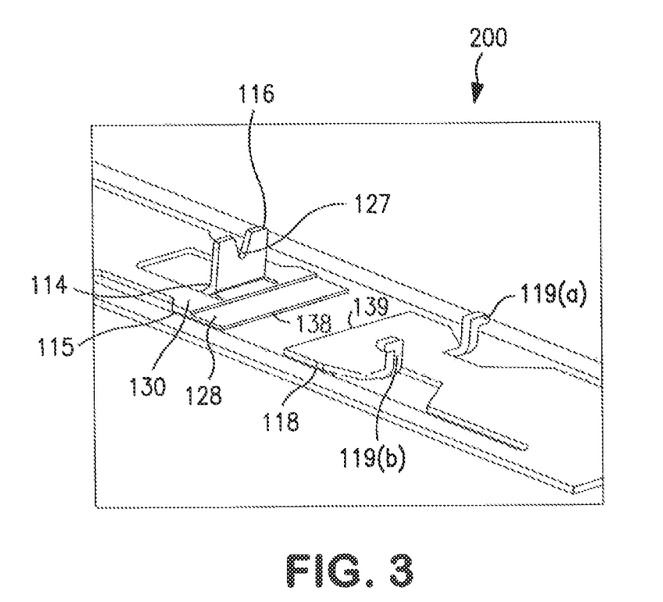
FIG. 3 is a perspective view of an anode termination and a cathode termination of a lead frame used in a solid electrolytic capacitor according to one embodiment of the present invention.
Figure 4:
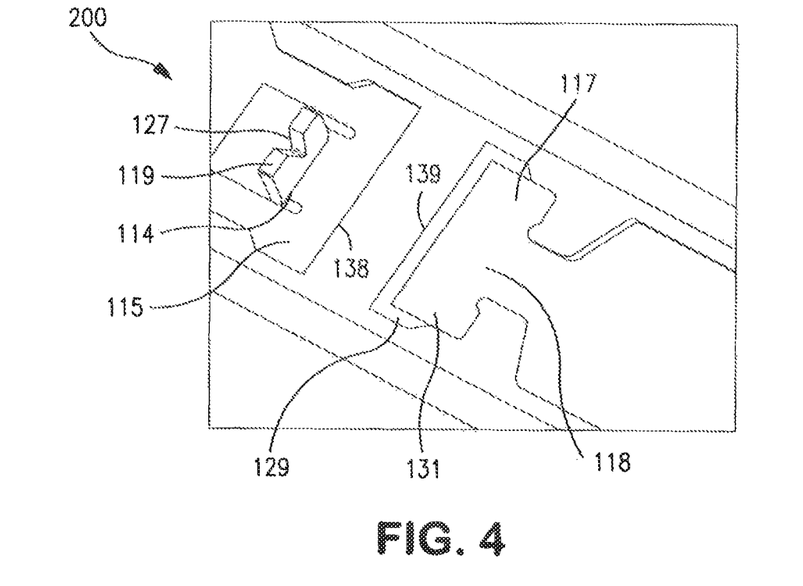
FIG. 4 is a lower surface perspective view of the anode termination and the cathode termination of the lead frame of FIG. 3.
Figure 5:
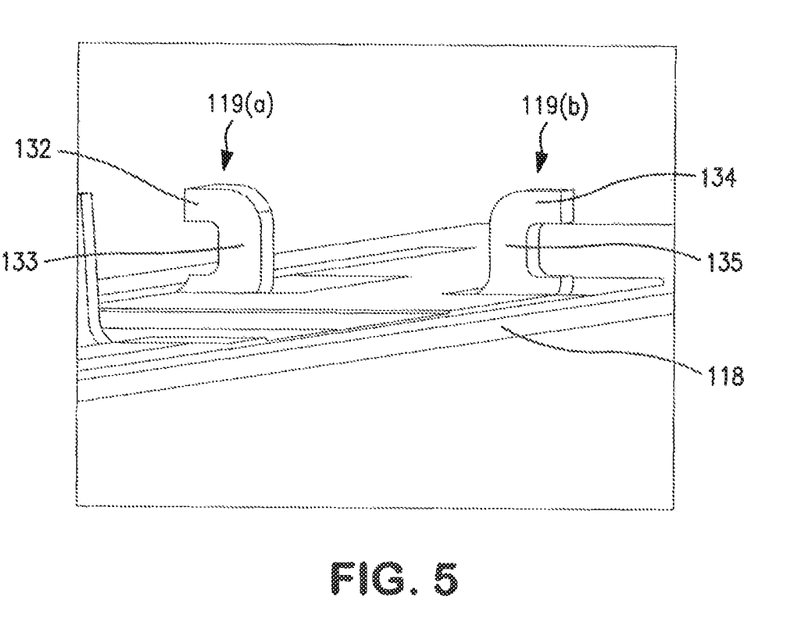
FIG. 5 is a perspective view of the cathode termination of FIG. 3.
Figure 6:
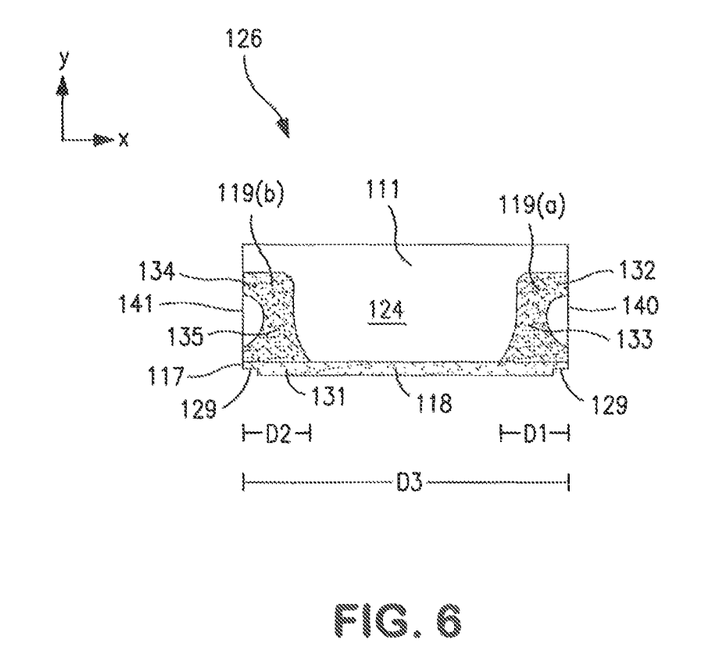
FIG. 6 is a view of the rear surface of a solid electrolytic capacitor element positioned in connection with the lead frame of FIG. 3.

Turning now to the cathode termination, reference can be made to FIGS. 1-6. As shown in FIGS. 1, 4, and 6, the cathode termination 117 has a planar portion 118 extending in the x-direction and an upstanding portion 119 extending in the y-direction. The planar portion 118 of the cathode termination 117 can also be coined, pressed, stamped, or otherwise modified such that it also has a thickness gradient. The resulting coined section 129 of the planar portion 118 of the cathode termination 117 extends around the periphery of the planar portion 118 of the cathode termination 117 at edges 140 and 141 of the rear surface 124 of the capacitor element 126 and at the edge 139 of the planar portion 118 of the cathode termination 117 that faces the anode termination 114. The coined section 129 has a smaller thickness than the remainder of the planar portion 118 of the cathode termination 117, which can be referred to as the uncoined section 131 of the planar portion 118 of the cathode termination 117. Such a configuration results in a planar portion 118 of the cathode termination 117 that can have an increased contact area with the lower surface 121 of capacitor element 126, such as via a conductive adhesive 120, which can improve the electrical stability of the resulting solid electrolytic capacitor 100.

Further, as shown in FIGS. 5 and 6, the upstanding portion 119 of the cathode termination generally extends in the y-direction and, in some embodiments, can have a first upstanding section 119(a) and a second upstanding section 119(b), where the sections are located on opposing vertical edges 140 and 141 of the rear surface of the capacitor element 124 in the y-direction. The first upstanding section 119(a) can have a paddle portion 132 and a vertical portion 133, while the second upstanding section 119(b) can have a paddle portion 134 and a vertical portion 135. The paddle portion 119(a) has a width in the x-direction D1 and the paddle portion 119(b) has a width in the x-direction D2 such that the width of both paddle portions D1 and D2 is from about 25% to about 65%, such as from about 30% to about 60%, such as from about 35% to about 55% of the total width D3 in the x-direction of the rear surface 124 of the capacitor element 126. The paddle-like shape and size, as well as the location of the first and second upstanding sections 119(a) and 119(b) at the vertical edges 140 and 141 of the rear surface 124 of the capacitor element 126 can help to lock the capacitor element 126 in place and prevent movement of the capacitor element 126 at the cathode end, which can, in turn, improve the mechanical and electrical stability of the solid electrolytic capacitor.

Figure 7:
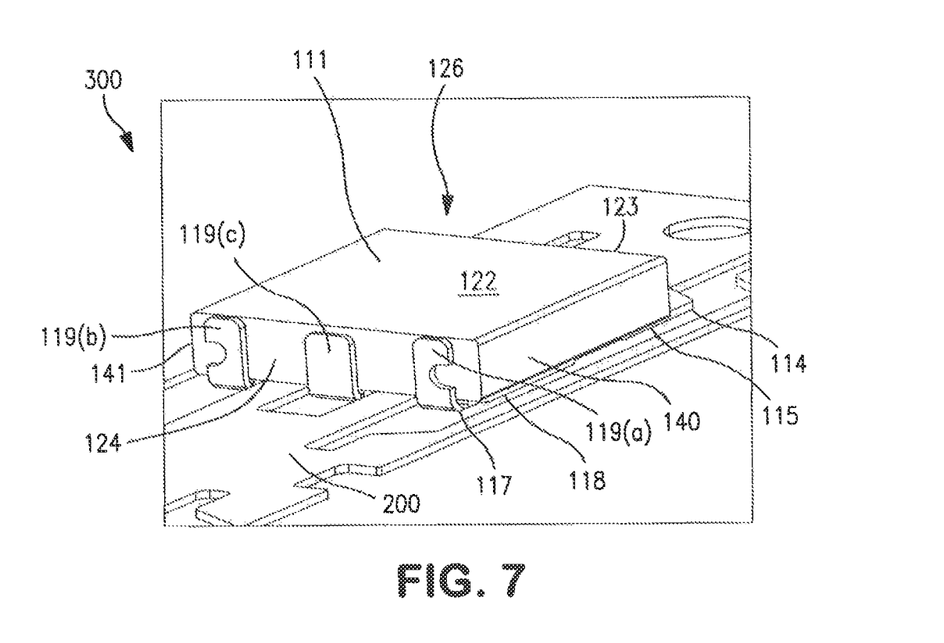
FIG. 7 is a perspective view of a capacitor element and lead frame of a solid electrolytic capacitor according to another embodiment of the present invention.
Figure 8:
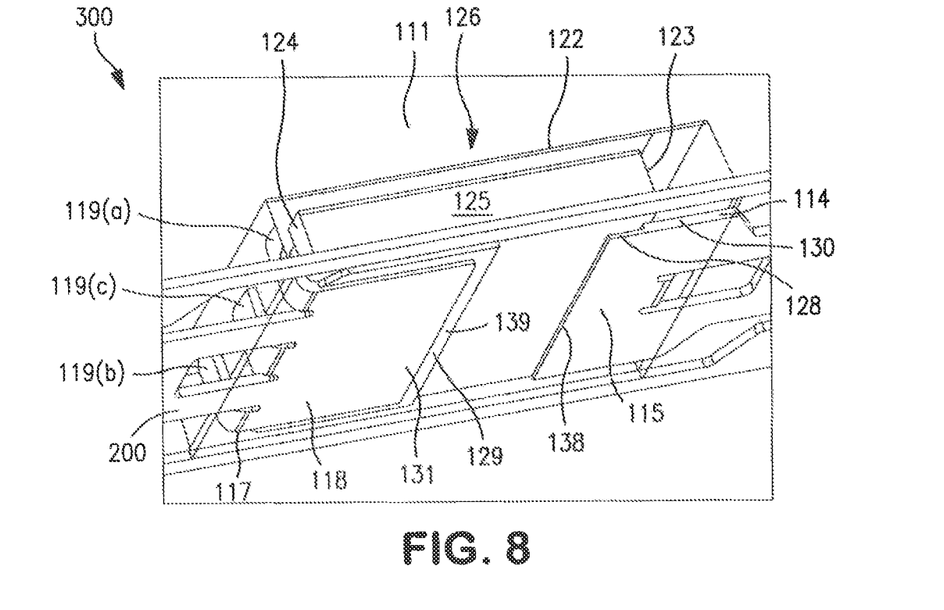
FIG. 8 is a lower surface view of the capacitor element and lead frame of FIG. 7.

Meanwhile, as shown in FIGS. 7 and 8, the upstanding portion 119 of the cathode termination of a capacitor 300 can have a first upstanding section 119(a), a second upstanding section 119(b), and a third upstanding section 119(c), where the sections 119(a) and 119(b) are located towards opposing vertical edges 140 and 141 of the rear surface of the capacitor element 124 in the y-direction, while the third upstanding section 119(c) can be positioned between sections 119(a) and 119(b). As discussed above in reference to FIGS. 5 and 6, the first upstanding section 119(a) can have a paddle portion 132 and a vertical portion 133, while the second upstanding section 119(b) can have a paddle portion 134 and a vertical portion 135. The paddle-like shape and size, as well as the location of the first and second upstanding sections 119(a) and 119(b) towards the vertical edges 140 and 141 of the rear surface 124 of the capacitor element 126 can help to lock the capacitor element 126 in place and prevent movement of the capacitor element 126 at the cathode end, which can, in turn, improve the mechanical and electrical stability of the solid electrolytic capacitor. In addition, the location of the third upstanding section 119(c) between the first and second upstanding sections 119(a) and 119(b) can provide additional mechanical and electrical stability to the solid electrolytic capacitor.

II. Anode Body

The anode and cathode terminations discussed above are utilized in conjunction with a capacitor element having an anode body formed from a valve metal composition. The porous anode body is typically formed from a valve metal composition having a high specific charge, such as about 5,000 μF*V/g or more, in some embodiments about 10,000 μF*V/g or more, in some embodiments about 20,000 μF*V/g or more. Such powders typically have a specific charge of from about 10,000 to about 600,000 μF*V/g, in some embodiments from about 40,000 to about 500,000 μF*V/g, in some embodiments from about 50,000 to about 400,000 μF*V/g, in some embodiments from about 70,000 to about 350,000 μF*V/g, and in some embodiments, from about 150,000 to about 300,000 μF*V/g. The valve metal composition contains a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al., U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and Heraeus (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Regardless of its particular composition, the powder is compacted around the anode lead so that at least a portion of the anode lead assembly extends from the compacted porous anode body. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the anode lead may be embedded therein. The die may define a single or multiple slots that allow for the insertion of the anode lead. If more than one anode lead is employed, the anode lead can be placed in close proximity to each other in order to be sinter-bonded, although this is not required. After filling the die with powder and embedding the anode lead(s) therein, the die cavity may then be closed and subjected to compressive forces by a punch. Typically, the compressive forces are exerted in a direction that is either generally parallel or generally perpendicular to the length of the anode lead, which extends along a longitudinal axis. This forces the particles into close contact with the anode lead and creates a strong anode lead-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body 33 is sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

III. Dielectric

Once constructed, a dielectric layer may be formed by anodically oxidizing ("anodizing") the sintered anode body. The dielectric may be formed by anodically oxidizing ("anodizing") the sintered anode so that a dielectric layer is formed over and/or within the anode body. For example, a tantalum (Ta) anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly (methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode body in that it possesses a first portion that overlies an external surface of the anode body and a second portion that overlies an interior surface of the anode body. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode body is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode body. In this regard, the electrolyte employed during the first stage may contain an acidic compound, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode body may also be rinsed or washed with another solvent (e.g., water) after the first and/or second stages to remove the electrolyte.

IV. Solid Electrolyte

A solid electrolyte overlies the dielectric that generally functions as the cathode for the capacitor. In one embodiment, the cathode of the solid electrolytic capacitor can be made principally from manganese dioxide and can be formed by a process generically termed manganizing. In this process, a conductive counter electrode coating is formed over the dielectric formed from anodizing. The manganizing step is typically performed by dipping the anodized device in a solution of manganous nitrate and heating the impregnated device in a moist atmosphere to convert the nitrate to a solid conductive manganese dioxide. In other words, a manganese dioxide solid electrolyte may be formed by the pyrolytic decomposition of manganous nitrate ($Mn(NO_3)_2$).

In another embodiment, the solid electrolyte may also be formed from one or more conductive polymer layers. For instance, the solid electrolyte can contain a conductive polymer, which is typically π-conjugated and have electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly(3,4-ethylenedioxythiophene) ("PEDT"). In one particular embodiment, a polythiophene derivative is employed with recurring units of general formula (I) or formula (II) or recurring units of general formulae (I) and (II):

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or test-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable polythiophene derivatives are those in which "A" is an optionally substituted $C_2$ to $C_3$ alkylene radical and x is 0 or 1. In one particular embodiment, the polythiophene derivative is PEDT and has recurring units of formula (II), wherein "A" is $CH_2$—$CH_2$ and "x" is 0. Methods for forming such polythiophene derivatives are well known in the art and described, for instance, in U.S. Pat. No. 6,987,663 to Merker, et al., which is incorporated herein in its entirety by reference thereto for all purposes. For example, the polythiophene derivatives may be formed from a monomeric precursor, such as optionally substituted thiophenes. Particularly suitable monomeric precursors are substituted 3,4-alkylenedioxythiophenes having the general formula (III), (IV) or a mixture of thiophene of general formulae (III) and (IV):

wherein, A, R, and X are as defined above.

Examples of such monomeric precursors include, for instance, optionally substituted 3,4-ethylenedioxythiophenes. Derivatives of these monomeric precursors may also be employed that are, for example, dimers or trimers of the above monomeric precursors. Higher molecular derivatives, i.e., tetramers, pentamers, etc. of the monomeric precursors are suitable for use in the present invention. The derivatives may be made up of identical or different monomer units and used in pure form and in a mixture with one another and/or with the monomeric precursors. Oxidized or reduced forms of these precursors may also be employed.

To produce the desired conductive polymer, monomeric precursors, such as described above, typically undergo oxidative polymerization in the presence of an oxidizing agent. The oxidizing agent may be a transition metal salt, such as a salt of an inorganic or organic acid that contain iron(III), copper(II), chromium(VI), cerium(IV), manganese(IV), manganese(VII), or ruthenium(III) cations. Particularly suitable transition metal salts include iron(III) cations, such as iron(III) halides (e.g., $FeCl_3$) or iron(III) salts of other inorganic acids, such as $Fe(ClO4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable for use in the present invention.

Various methods may be utilized to apply the solid electrolyte onto the anode part. In one embodiment, the oxidizing agent and monomeric precursor are applied, either sequentially or together, such that the polymerization reaction occurs in situ on the part. Suitable application techniques may include screen-printing, dipping, electrophoretic coating, and spraying, may be used to form a conductive polymer coating. As an example, the monomeric precursor (e.g., 3,4-ethylenedioxy-thiophene) may initially be mixed with the oxidizing agent to form a solution. One suitable oxidizing agent is CLEVIOS™ C, which is iron HI toluenesulfonate and sold by Heraeus. CLEVIOS™ C is a commercially available catalyst for CLEVIOS™ M, which is 3,4-ethylene dioxythiophene, a PEAT monomer also sold by Heraeus. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

As the monomer contacts the surface of the anode part containing the oxidizing agent, it may chemically polymerize thereon. Polymerization may be performed at temperatures of from about –10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive polymer coating(s) may be described in U.S. Pat. No. 5,457,862 to Sakata, et al. U.S. Pat. No. 5,473,503 to Sakata, et al., U.S. Pat. No. 5,729,428 to Sakata, et al., and U.S. Pat. No. 5,812,367 to Kudoh et al., which are incorporated herein in their entirety by reference thereto for all purposes.

In addition to in situ application, the solid electrolyte may also be applied to the part in the form of a dispersion of solid conductive polymer particles. Although their size may vary, it is typically desired that the particles possess a small diameter to increase the surface area available for adhering to the anode part. To enable good impregnation of the anode body, the particles employed in the dispersion typically have a small size, such as an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

The formation of the conductive polymers into a particulate form may be enhanced by using a separate counterion to counteract a charged conductive polymer (e.g., polythiophene). That is, the conductive polymer (e.g., polythiophene or derivative thereof) used in the solid electrolyte typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the solid electrolyte is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), and alcohols (e.g., ethylene glycol, glycerol, di- or triethylene glycol).

The polymeric dispersion may be applied to the part using a variety of known techniques, such as by spin coating, impregnation, pouring, dropwise application, injection, spraying, doctor blading, brushing or printing (e.g., ink-jet, screen, or pad printing). Although it may vary depending on the application technique employed, the viscosity of the dispersion is typically from about 0.1 to about 100,000 mPa·s (measured at a shear rate of 100 $s^{-1}$), in some embodiments from about 1 to about 10,000 mPa·s, in some embodiments from about 10 to about 1,500 mPa·s, and in some embodiments, from about 100 to about 1000 mPa·s. Once applied, the layer may be dried and washed. One or more additional layers may also be formed in this manner to achieve the desired thickness. Typically, the total thickness of the layer(s) formed by this particle dispersion is from about 1 to about 50 μm, and in some embodiments, from about 5 to about 20 μm. The weight ratio of counterions to conductive polymers is likewise from about 0.5:1 to about 50:1, in some embodiments from about 1:1 to about 30:1, and in some embodiments, from about 2:1 to about 20:1.

In addition to applying the solid electrolyte via in situ polymerization or via the application of a dispersion of conductive polymer particles, it is also to be understood that the solid electrolyte can be applied via a hybrid process that combines both in situ polymerization and the application of a dispersion of conductive polymer particles. For example, in one embodiment, a capacitor element can include a solid electrolyte formed from multiple layers. More specifically, the solid electrolyte can include a first conductive polymer layer that is in contact with a dielectric that overlies an anode body. The first layer may contain a conductive polymer (e.g., PEDT) that is formed through in situ polymerization of an oxidizing agent and monomeric precursor. The solid electrolyte can also contain a second conductive polymer layer that generally overlies the first layer. The second layer may be formed from a dispersion of particles that contains a conductive polymer (e.g., PEDT), binder, and an optional counterion (e.g., PSS). One benefit of employing such a dispersion is that it may be able to penetrate into the edge region of the capacitor body to achieve good electrical contact with the inner layer and increase the adhesion to the capacitor body. This results in a more mechanically robust part, which may reduce equivalent series resistance and leakage current. On the other hand, in another embodiment, the solid electrolyte may be a single conductive polymer layer. Regardless of how many layers it includes, the resulting solid electrolyte typically has a total thickness of from about 1 micrometer (μm) to about 200 μm, in some embodiments from about 2 μm to about 50 μm, and in some embodiments, from about 5 μm to about 30 μm. Further, if the solid electrolyte includes two layers such as an inner layer and an outer layer, the inner layer may have a total thickness of from about 0.1 μm to about 100 μm, in some embodiments from about 0.5 μm to about 20 μm, and in some embodiments, from about 1 μm to about 5 μm, while the outer layer may have a total thickness of from about 0.2 μm to about 100 μm, in some embodiments from about 1 μm to about 40 μm, and in some embodiments, from about 3 μm to about 10 μm.

Regardless of the particular manner in which it is formed, the solid electrolyte may be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

V. Additional Layers

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 W/cm, in some embodiments greater than about 100, in some embodiments greater than about 1,000 W/cm, in some embodiments greater than about $1 \times 10^5$ W/cm, and in some embodiments, greater than about $1 \times 10^{10}$ W/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anode part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

VI. Assembly

As discussed in detail above, the electrolytic capacitor of the present invention includes an anode termination to which the anode lead of the capacitor element is electrically connected and a coined cathode termination to which the cathode of the capacitor element is electrically connected. Once the capacitor element is attached to the anode termination and cathode termination as discussed above, capacitor element and terminations can be enclosed within a casing, which may then be filled with silica or any other known encapsulating material 112 as shown in FIG. 1. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element is encapsulated so that at least a portion of the anode termination 114 and cathode termination 118 are exposed. In some cases, the exposed portion of the anode and cathode terminations may be located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

The present invention may be better understood by reference to the following examples.

Test Procedures

The capacitance and dissipation factor were measured using a Keithley 3330 Precision LCZ meter with Kelvin Leads with 2 volts bias and 1 volt signal. The operating frequency was 120 Hz and the temperature was 23° C.±2° C. Open circuits were detected from such measurement procedure.

The body cracks were detected optically via microscope detection using a Carl Zeiss Stemi DV4 stereo microscope.

EXAMPLE 1

A tantalum anode (5.60 mm×1.20 mm×5.00 mm) was initially pressed from 70 k CV powder, sintered at 1300° C. and anodized at 35.8V in a liquid electrolyte to 330 µF. A conductive polymer coating was then formed by dipping the anode into a butanol solution of iron (III) toluenesulfonate (CLEVIOS™ C) for 15 minutes and consequently into 3,4-ethylenedioxythiophene (CLEVIOS™ M) for 1 minute. After 45 minutes of polymerization, a thin layer of poly(3,4-ethylenedioxythiophene) was formed on the surface of the dielectric. The parts were washed in methanol to remove reaction by-products, re-anodized in a liquid electrolyte, and washed again in methanol. The polymerization cycle was repeated 5 times. Thereafter, the parts were dipped into a dispersed poly(3,4-ethylenedioxythiophene)-poly(styrenesulfonate) having a solids content of 1% (Clevios™ K). Upon coating, the parts were dried at 125° C. for 20 minutes. This process was repeated 16 times. The parts were then coated with graphite and silver as is known in the art. The resulting capacitor element was then placed in a pocket of a standard undertab lead frame to form anode and cathode terminations. Once positioned in the desired manner, the anode wire was welded to the anode termination using a pulsed laser beam. The capacitor element was then encapsulated within a "4" case having a length of about 7.30 mm, a height of about 2.00 mm, and a width of about 6.00 mm. The finished part was treated with lead-free reflow. 700 parts were made by the method described above.

EXAMPLE 2

Capacitors were formed in the manner described in Example 1, except that a coined lead frame was utilized. In particular, the capacitor element was placed in a pocket of a lead frame as shown in FIG. 2, 700 parts were made by the method described above.

EXAMPLE 3

Capacitors were formed in the manner described in Example 1, except that a coined lead frame was utilized. In particular, the capacitor element was placed in a pocket of a lead frame as shown in FIGS. 3-4, 700 parts were made by the method described above.

EXAMPLE 4

Capacitors were formed in the manner described in Example 1, except that a coined lead frame was utilized. The capacitor element was placed in a pocket of a lead frame as shown in FIGS. 7-8. 700 parts were made by the method described above.

The results are set forth below in Table 1 and indicate that utilizing a coined lead frame improves the mechanical performance of the resulting capacitor.

TABLE 1

| | Mechanical Performance | |
|---|---|---|
| | Open Circuit [%] | Body Cracks [%] |
| Example 1 | 23 | 96 |
| Example 2 | 15 | 21 |
| Example 3 | 4 | 18 |
| Example 4 | 1 | 0 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor, the solid electrolytic capacitor comprising:
a capacitor element having a front surface, a rear surface, an upper surface, and a lower surface, wherein the capacitor element comprises a sintered, porous anode body; a dielectric overlying the anode body; and a solid electrolyte cathode overlying the dielectric, wherein an anode lead extends from the front surface of capacitor element in a longitudinal direction;
an anode termination having a planar portion and an upstanding portion, wherein the planar portion of the anode termination has a first section and a second section, wherein the first section has a first thickness and the second section has a second thickness, wherein the second thickness is less than the first thickness, wherein the first section is disposed between the upstanding portion and the second section, wherein the second section is disposed beneath the lower surface of the capacitor element, wherein the first section and the second section define a lower surface of the planar portion of the anode termination, further wherein the anode lead and capacitor element are generally parallel with the planar portion of the anode termination; and a cathode termination having a planar portion and an upstanding portion, wherein the planar portion of the cathode termination has a first section and a second section, wherein the first section has a first thickness and the second section has a second thickness, wherein the second thickness is less than the first thickness, wherein the second section is located at an edge of the planar portion of the cathode termination facing the planar portion of the anode termination, and wherein the first section defines a lower surface of the planar portion of the cathode termination.

2. The solid electrolytic capacitor of claim 1, wherein the anode termination second thickness is from about 10% to about 90% of the anode termination first thickness.

3. The solid electrolytic capacitor of claim 1, wherein the first section of the planar portion of the anode termination is uncoined.

4. The solid electrolytic capacitor of claim 1, wherein the second section of the planar portion of the anode termination is coined.

5. The solid electrolytic capacitor of claim 4, wherein the anode lead is electrically connected to the upstanding portion of the anode termination at a slot formed in the upstanding portion of the anode termination.

6. The solid electrolytic capacitor of claim 1, wherein the anode lead is electrically connected to the upstanding portion of the anode termination.

7. The solid electrolytic capacitor of claim 1, wherein the cathode termination second thickness is from about 10% to about 90% of the cathode termination first thickness.

8. The solid electrolytic capacitor of claim 1, wherein the first section of the planar portion of the cathode termination is uncoined.

9. The solid electrolytic capacitor of claim 1, wherein the second section of the planar portion of the anode termination is coined.

10. The solid electrolytic capacitor of claim 1, wherein the upstanding portion of the cathode termination has a first upstanding section and a second upstanding section.

11. The solid electrolytic capacitor of claim 10, wherein the first upstanding section of the cathode termination is located at a first vertical edge of the rear surface of the capacitor element and the second upstanding section of the cathode termination is located at an opposing second vertical edge of the rear surface capacitor element.

12. The solid electrolytic capacitor of claim 10, wherein the first upstanding section of the cathode termination and the second upstanding section of the cathode termination each have a vertical portion and a paddle portion disposed above the vertical portion.

13. The solid electrolytic capacitor of claim 11, wherein the paddle portions have a total width that is from about 25% to about 65% of a width of the rear surface of the capacitor element.

14. The solid electrolytic capacitor of claim 11, wherein the upstanding portion of the cathode termination further includes a third upstanding section, wherein the third upstanding section is disposed between the first upstanding section and the second upstanding section.

15. The solid electrolytic capacitor of claim 1, wherein the solid electrolyte contains a polypyrrole, polythiophene, polyaniline, polyacetylene, poly-p-phenylene, polyphenolate, or a combination thereof.

16. A method for forming a capacitor from a capacitor element and a lead frame, wherein the lead frame includes an anode termination and a cathode termination, the anode termination having a planar portion and an upstanding portion, and the cathode termination having a planar portion and an upstanding portion, and further wherein the capacitor element includes an anode, a dielectric layer overlying the anode, and a solid electrolyte cathode overlying the dielectric layer, wherein an anode lead extends from a surface of the capacitor element, the method comprising:
- coining the planar portion of the anode termination to form a planar portion having a first section with a first thickness and a second section with a second thickness, wherein the second thickness is less than the first thickness, wherein the first section and the second section define a lower surface of the planar portion of the anode termination;
- coining the planar portion of the cathode termination to form a planar portion having a first section with a first thickness and a second section with a second thickness, wherein the second thickness is less than the first thickness, wherein the second section is located at an edge of the planar portion of the cathode termination facing the planar portion of the anode termination, and wherein the first section defines a lower surface of the planar portion of the cathode termination;
- disposing a conductive adhesive on the planar portion of the cathode termination;
- positioning the capacitor element above the second section of the planar portion of the anode termination and the planar portion of the cathode termination of the lead frame so that a lower surface capacitor element contacts the conductive adhesive, wherein the capacitor element is generally parallel with the planar portion of the anode termination and the planar portion of the cathode termination; and
- electrically connecting the anode lead to the upstanding portion of the anode termination, wherein the anode lead is generally parallel with the planar portion of the anode termination.

17. The method of claim 16, wherein the anode lead is welded to the upstanding portion of the anode termination at a slot formed in the upstanding portion of the anode termination.

18. The method of claim 16, wherein the cathode portion further comprises a tab that extends from the base.

19. The method of claim 16, further comprising bending the anode portion of the lead frame to form an upstanding anode termination portion, wherein the anode lead is electrically connected to the upstanding anode termination portion.

20. The method of claim 16, further comprising encapsulating the capacitor element with an encapsulating material so that at least a part of the anode termination and at least a part of the cathode termination of the lead frame remain exposed.

* * * * *